United States Patent
Rodin

Patent Number: 5,461,213
Date of Patent: Oct. 24, 1995

[54] HEATED FLOOR

[76] Inventor: Håkan Rodin, Björn Barkmans väg 31, S-148 00 Ösmo, Sweden

[21] Appl. No.: 162,152
[22] PCT Filed: Jun. 1, 1992
[86] PCT No.: PCT/SR92/00368
§ 371 Date: Feb. 14, 1994
§ 102(e) Date: Feb. 14, 1994
[87] PCT Pub. No.: WO92/22773
PCT Pub. Date: Dec. 23, 1992

[30] Foreign Application Priority Data

Jun. 12, 1991 [SE] Sweden ............... 9101794

[51] Int. Cl.⁶ ........................ H05B 3/26
[52] U.S. Cl. ....................... 219/213; 219/548
[58] Field of Search ............... 219/213, 528, 219/529, 548, 549, 535, 543; 392/436

[56] References Cited

U.S. PATENT DOCUMENTS

| | | | |
|---|---|---|---|
| 2,138,217 | 11/1938 | Sutter | 219/213 |
| 2,540,465 | 2/1951 | Tice . | |
| 2,612,585 | 9/1952 | McCann . | |
| 3,095,491 | 6/1963 | Deacon | 219/213 |
| 3,303,324 | 2/1967 | Appleman | 219/213 |
| 3,564,207 | 2/1971 | Joeckel | 219/544 |
| 3,812,320 | 5/1974 | Borgren | 219/213 |
| 4,185,186 | 1/1980 | Williams | 219/213 |
| 4,415,798 | 11/1983 | Knappe | 219/213 |
| 4,859,834 | 8/1989 | Hausler et al. | 219/497 |
| 4,873,332 | 11/1989 | Drake | 219/213 |
| 5,029,231 | 7/1991 | Carr | 392/436 |

FOREIGN PATENT DOCUMENTS

| | | |
|---|---|---|
| 0003711 | 8/1979 | European Pat. Off. . |
| 0360889 | 4/1990 | European Pat. Off. . |
| 2915219 | 11/1986 | Germany . |
| 3613033 | 10/1987 | Germany . |
| 3917873 | 12/1990 | Germany . |
| 63-201435 | 8/1988 | Japan . |

Primary Examiner—Teresa J. Walberg
Attorney, Agent, or Firm—Young & Thompson

[57] ABSTRACT

A heated floor construction includes a supporting structure or an existing floor construction (1), a number of components (4) of sheet material (2), at least one electric heating cable (5) and a device (REG) for regulation of the heat dissipation of the heating cable. The heating cable is disposed in at least one channel (7) between the different sheet components. The channel has a width adapted to the largest diameter of the electric heating cable (5). The width of the sheet components (4) approximately corresponds to the predetermined cable spacing (cc-distance) minus the largest diameter of the heating cable, and the corners (11) of the sheet components (4) at the ends where the heating cable (5) changes direction are bevelled or cut-off. The channel is limited below by the floor construction (1). The sheet components are laid out on and fixed to the supporting or existing floor construction in such a way that the heating cable can be laid directly in the channel. The sheet material has a thickness which approximately corresponds to the greatest diameter of the heating cable, and a surface material (8) is disposed on the upper surface of the sheet components.

19 Claims, 4 Drawing Sheets

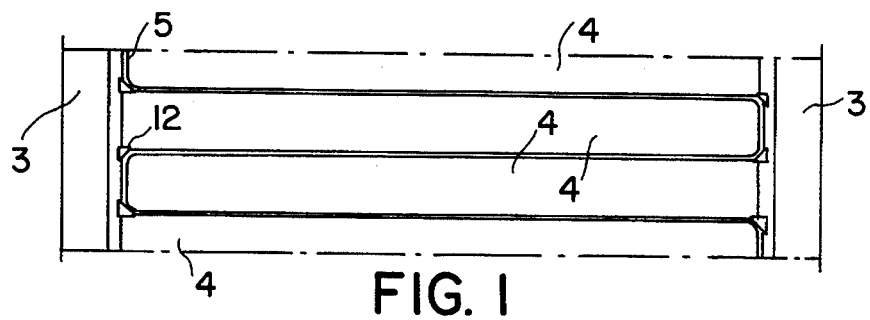
FIG. 1
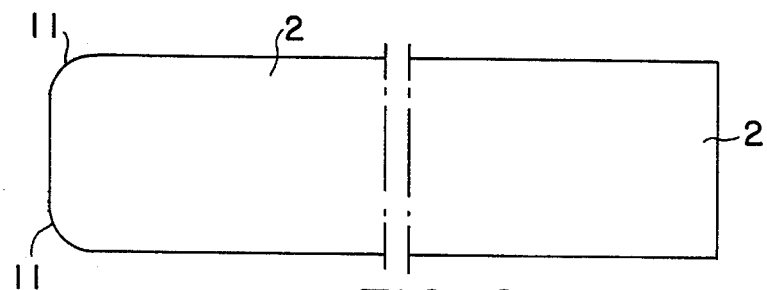
FIG. 2
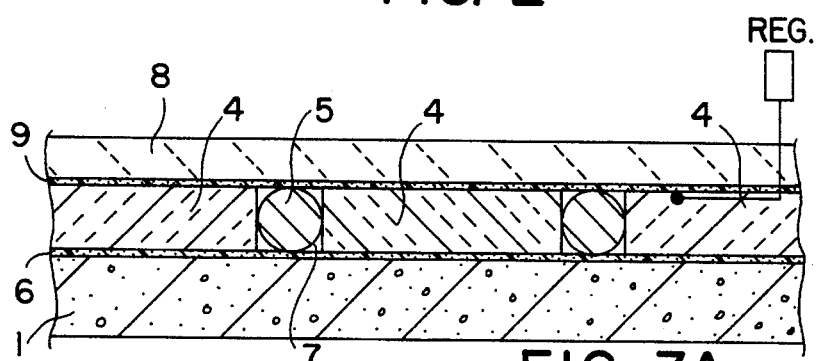
FIG. 3A
FIG. 3B
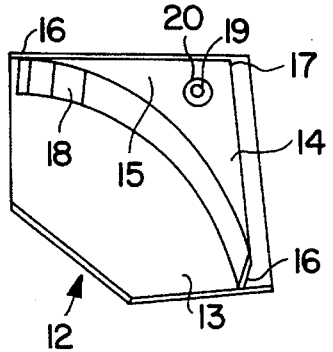
FIG. 4
FIG. 5

HEATED FLOOR

FIELD OF THE INVENTION

The present invention relates to a heated floor construction comprising a supporting or existing floor construction, a number of components of a sheet material, at least one heat dissipating means in the form of an electrical heating cable, and a device for regulating the heat dissipation of the heating cable, said heating cable being disposed in at least one channel between the different sheet components, said channel or channels having a width which is adapted to the largest diameter of the electrical heating cable, and said sheet components having a width which approximately corresponds to the predetermined cable spacing (cc-distance) minus the greatest diameter of the heating cable, the corners of the sheet components at those ends where the heating cable changes direction, being bevelled or cut-off.

BACKGROUND OF THE INVENTION

Heated floors are previously known in a number of different forms, for example a plaster netting can be laid on top of the supporting structure and be fixed to the surface of the floor structure by glueing, for example. The electrical heating cable is then fixed to the plaster netting, first being laid out in a loop pattern and then being fixed by hot melt adhesive to the plaster netting. When the electrical heating cable has been completely laid out, it is covered with a plastering material in such a manner as to cover completely. The covering plaster is then allowed to dry and is then provided with an adhesive for laying, so-called clinker. The disadvantages of these methods are the risk of having the wrong cc-distance between the heating cables, a too small bending radius which involves the risk of cable breakage in addition to the fact that laying, drying and curing take a long time before the electrical heating cable can be used, usually one month. Similar constructions are also available where the electrical heating cable has been replaced by water pipes, for example PEX-piping.

The purpose of the present invention is to create a heated floor construction which is simple to install both for new construction and renovation.

An additional purpose of the invention is to provide a heated floor construction which is suitable for laying on a floor with a high moisture content, e.g. a concrete slab which absorbs ground moisture.

SUMMARY OF THE INVENTION

The heated floor construction according to the invention is characterized in that the channel or channels are limited below by the supporting or existing floor construction, that the sheet components consist of transverse sheet components and/or longitudinal sheet components, which are laid out and fixed to the supporting or existing floor construction in such a manner that the heating cable can be laid directly in the channel or channels as a single loop or be divided into a plurality of different loops, that the sheet material has a thickness, which approximately corresponds to the greatest diameter of the heating cable, and that a surface material is disposed on the upper surface of the sheet components.

The heated floor construction according to the invention makes possible more rapid, more effective and simpler laying and immediate use, since no time is required for drying of any component material. The floor construction makes it possible to make the applied heated layer relatively thin, i.e. suitably 18 mm and thicker. A relatively thin applied layer provides relatively low thermal inertia, which can be increased by placing spacer material in the floor construction which would then serve as an extra heat depot.

The construction comprises transverse sheet components and longitudinal sheet components which, depending on the shape of the room, can form either a right angle or another angle. Channels are formed between the sheet components, in which an electrical heat cable is laid. The sheet components are bevelled or rounded at the corners, where the heat cable changes direction and the heat cable is guided around the corner with the aid of a corner piece placed radially outside the corner, which has an arcuate shape agreeing with the desired curvature of the heating cable. The corner piece can be made for angles between 90 and 135 degrees, preferably in five different versions 90–107 degrees, 108–117 degrees, 118–126 degrees, 127–134 degrees, and 135 degrees. The corner piece has a thickness which approximately corresponds to the thickness of the sheet components. The heating cable can be held in place in the channels with clips fixed to the two opposing longitudinal edges of the sheet components, or with adhesive. The sheet components are fixed to the supporting floor with an adhesive paste. The heating cable can also lie in this adhesive paste. The construction can be provided with a heat reflecting foil and/or an oxidation insulation, which is laid on top of the sheet components but is hold down so that the heating cable lies on top of the heat reflecting foil to minimize heat radiation to the subfloor and to better spread the heat in the construction. A special conductive tape for diverting magnetic/electrical fields which can arise in the construction, can be disposed so that the heat reflecting foil and and/or oxidation insulation is grounded. In another embodiment, the heat reflecting foil has been left out in order to provide a certain Mount of additional heat to the subfloor. The surface material is fixed to the sheet components with an adhesive paste, which is applied to the top side of the sheet components and possibly also to the top side of the heating cable.

The heated floor construction can be laid according to a method where a number of components of a sheet material a number of components of a sheet material and with a predetermined width are laid and fixed directly to a supporting or an existing floor construction in such a manner that there is formed between the sheet components at least one channel with a width and a depth approximately equal to the diameter of an electric heating cable, said channel being limited downwardly by the supporting or the existing floor construction, that corner pieces are applied at the corners of the sheet components around which the heat cable is to be guided, that one or more heat cables are laid in the channel or channels, and that a surface material is laid on the upper surface of the sheet material.

The heated floor construction also comprises a device for regulating the heat given out by the heating cable. The regulating device can also regulate the heat given out from other heating means, for example wall mounted electric radiators.

The regulating device can be used to control the heating of an entire house, or parts of a house. Those portions of a house which are to be heat regulated with the regulating device can be divided into a number of temperature zones. A separate space such as a room can be one temperature zone. The temperature in each temperature zone can be regulated independently of the temperature in the other temperature zones. Each temperature zone can comprise at least one heat dissipating means and at least one temperature sensor.

The installation of the floor construction can be facilitated by calculating beforehand with a specially written computer program heat requirements, the size of the sheet components, the length or lengths of the heating cable or cables with the aid of the necessary physical data for the building.

The computer program can also provide, via a plotter or the like, a complete installation drawing and a laying plan for the sheet components and the heating cable. The computer program can also control one or more numerically controlled manufacturing machines which can produce one or more of the components in the construction.

BRIEF DESCRIPTION OF THE DRAWINGS

The invention will now be described with reference to the drawings, which illustrate schematically the floor construction and in which:

FIG. 1 is a schematic drawing showing the lay-out of the floor according to the invention, FIG. 2 shows a plan view of a sheet component, FIG. 3a shows a section through a floor according to the invention without a heat reflecting foil, FIG. 3b shows a section through the floor according to the invention with heat reflecting and heat dissipating foil and with spacer material, FIG. 4 shows a corner piece in perspective, FIG. 5 shows schematically a clip for holding the cable in the channels.

DETAILED DESCRIPTION OF THE INVENTION

Figure 6:
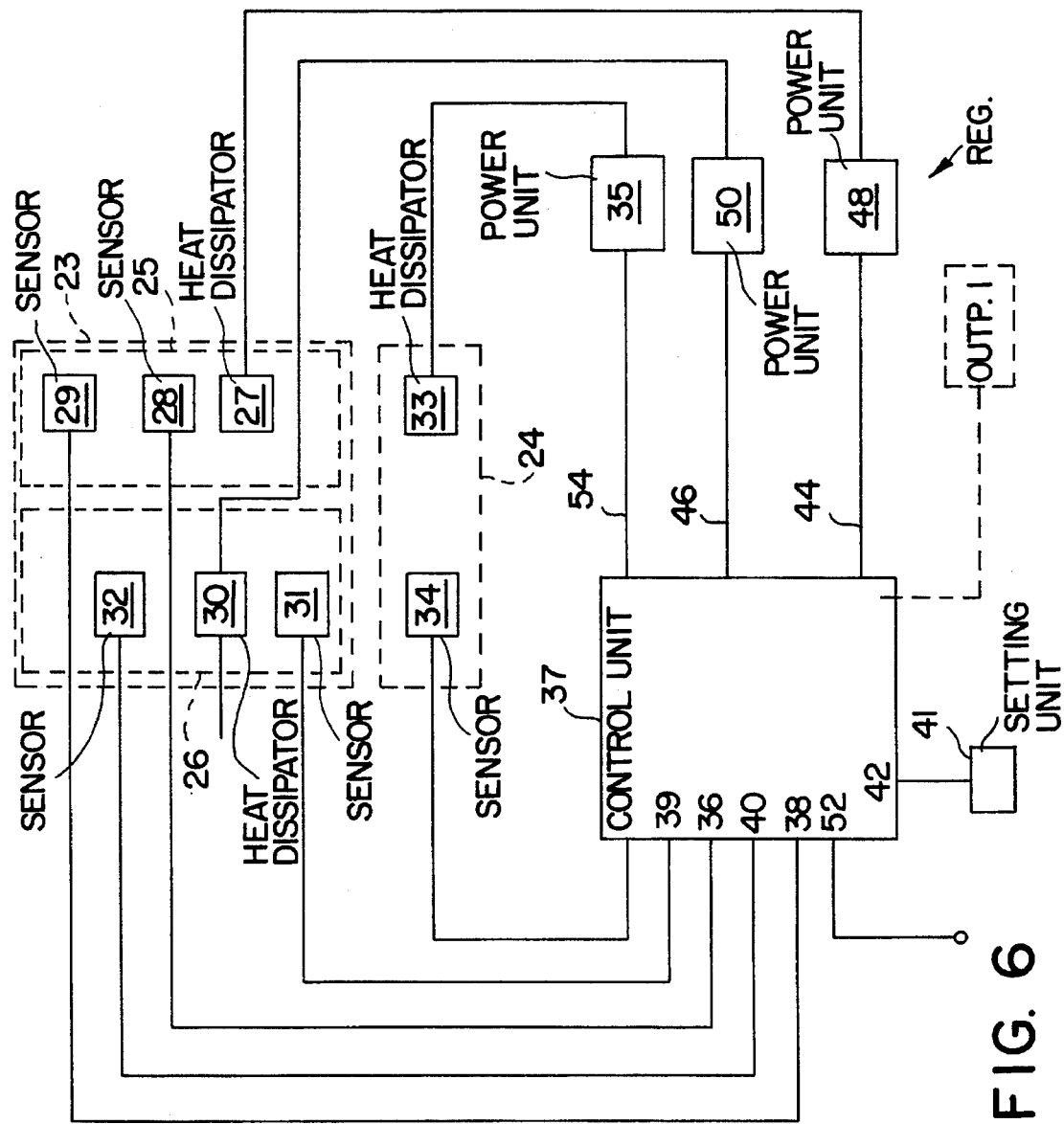
FIG. 6 shows schematically an embodiment of the device for regulating the heat given out from the heating cable.

When laying the floor construction according to the invention on either an existing or new floor structure 1, a sheet material 2 is used suitably a gypsum board, which is divided into longitudinal and transverse sheet components 3 and 4, respectively, which preferably have been cut in such a manner that the entire length of the gypsum board has been retained, while the width of the sheet component 2 is dependent on the heating cable 5 which is to be laid. A large heat requirement will require a long heating cable 5 and closer spacing between the loop portions, and thus thinner sheet components 2. If the heat requirement is small, a shorter cable 5 is required and therefore a greater spacing between the loop portions. The heat energy emitted from the floor can also be regulated by changing the power of the electrical heating cable 5. The width of the sheet components 2 can vary from, for example, 5 cm up to 30 cm, a normal width being about 16 cm. The heating cable 5 can be single conductor, multi-conductor and/or self limiting.

As a sheet material, gypsum boards are used primarily, but other suitable sheet materials can be glass-fibre reinforced concrete, polyurethane cellular plastic of high weight per volume, a particle board, or other laminated board. The sheet components 2 are fixed to the floor structure or subfloor 1 with an adhesive 6, but glueing, spackling, screwing or nailing is also possible. The electrical heating cable 5 is laid in the channels 7 formed between the laid-out sheet components. When the heat cable 5 is laid in the channel 7 and fixed therein, a surface coating or a surface material 8 is laid on top of the heating cable and the sheet components. The surface coating 8, which can consist of clinker, plastic matting, parquet flooring, wooden plank flooring, wall-to-wall carpeting or some other flooring material is fixed with a suitable adhesive paste 9, or by nailing, screwing, glueing, taping or the like or can be laid unanchored. When laying a homogeneous parquet floor in the traditional manner, sand can be laid on top of the sheet components and the parquet pieces be laid on the sand. The thermal inertia of such a construction using sand will be somewhat greater, however.

For thin surface coverings, a spatial material 10 is laid between the sheet components and the surface covering 8 in order to obtain the prescribed dimension between the heating cable 5 and the upper edge of the surface layer. The spatial material can be fixed to the lower portion of the construction with the aid of an adhesive material 9 like that used for applying the surface material.

The electrical heating cable 5 can be laid as a single loop or be divided into a number of different loops for easier regulation of the heat supplied to the room. Connecting cables are connected to one or both ends of the heating cable 5 (the heating cable is defined as the heat dissipating portion and the connecting cables which are joined to the heat dissipating portion). The length of the heating cable is dimensioned in such a manner that a portion of the connecting cables are laid in the floor construction.

The corners 11 of the sheet components, which the heating cable 5 is to be laid around, are bevelled or cut so that a corner is formed with a roughly arcuate profile, so that the heating cable cannot be buckled or bent. At the corners 11, corner pieces 12 can be applied, which are arranged radially outside the heating cable 5 and are designed to guide the heating cable 5 so that it is not bent more than the allowed minimum bending radius. The corner pieces can be made for different bending angles of the heating cable 5. Angles other than 90 degrees are possible, inter alia when laying floors in rooms where the walls are not arranged at right angles to each other. The corner pieces most used are for angles of 90 degrees, but these can also be used for angles up to 98 degrees. For greater angles, corner pieces for the intervals 99–107 degrees, 108–116 degrees, 117–125 degrees, 126–134 degrees and 135 degrees be used.

The corner piece 12 consists of a bottom plate 13, which is so thin that it can be slipped under the sheet components 3, 4. On the bottom plate 13, there is a homogeneous upper piece 14, the homogeneous upper piece 14 having a flat upper surface 15 and two edge surfaces 16, which form an angle 17 to each other of between 45° and 90°, 90, 81, 72, 63, 54, or 45 degrees depending on the type of corner piece. The two edge surfaces 16 are Joined at a surface 18 with a bending radius corresponding to the least allowed bending radius for the heating cable 5. The height of the corner pieces 12 corresponds approximately to the thicknesses of the sheet components 3, 4. The corner pieces 12 can be provided with through-holes 19 for fixing means and be countersunk 20 for the head of the fixing means. The holes between the heating cable, the corner piece and the sheet component can be filled with filling plaster, for example.

The heating cable 5 can also be fixed in the channels 7 with the aid of clips 21 cooperating with the edges of the opposing sheet components 3, 4, or by adhesive or tape. In order to reduce the heat reflection downwards in the building construction, a heat reflecting and heat conducting foil can be laid on the respective sheet components 3, 4, and then be drawn under the heating cable 5 in such s manner that a layer covers the entire construction. The foil can be fixed along the entire length of the sheet component 3, 4 on its top side and be pulled down along one longitudinal edge to terminate on the under side of the sheet component. The foil can also be fixed to the other longitudinal edge and terminate in a loose pocket, which is intended to be placed under the heating cable 5 and under the adjacent sheet component 3, 4.

The floor construction can also be used where moisture problems have arisen, for example in cellar floor and other floor constructions with large amounts of absorbed ground moisture, i.e. an inproperly insulated slab on ground having a too high moisture content. The heat reflecting foil 22 is then left out and as a sheet material 2, there is preferably selected a glass-fiber reinforced concrete sheet which cannot be destroyed by excessive moisture. The fixing material and the floor coating can be moisture transmitting. By leaving out the heat reflecting foil 22, a portion of the heat from the heating cable 5 reflects down into the floor constuction and contributes to dry out the same.

FIG. 6 shows schematically an embodiment of the device for regulating heat dissipation from the heat dissipating means within two temperature zones 23 and 24. The temperature in zone 23 can be regulated regardless of the temperature in zone 24. Zone 23 comprises two subzones 25 and 26. The subzone 25 is provided with heat dissipating means 27 and two temperature sensors 28 and 29, while subzone 26 is provided with a heat dissipating means 30 and two temperature sensors 31 and 32.

The temperature in zone 23 can thus be regulated with two separate heat dissipating means, which can be controlled independently of each other and be placed in different subzones. This is of advantage, for example when the zone 23 consists of a room which is provided with large windows and is sometimes subjected to strong sunlight. When the subzone 26 is heated, for example by solar radiation, the energy supply to the heat dissipating means 30 is reduced correspondingly to prevent uneven temperature distribution in the zone. The zone 23 can of course also be divided into more than two subzones and be regulated according to the same principle as above.

The zone 24 is provided with a heat dissipating means 33 and a temperature sensor 34 and is supplied with energy from a power unit 35. The temperature sensors can also be arranged to sense air temperature, surface temperature and heat radiation.

FIG. 6 shows schematically one embodiment of the device for regulating the heat dissipation from the heat dissipating means. The heat dissipating means 27 and 30 can be heating cables, as described above. The heating cable 27 is arranged in the floor within subzone 25, within which subzone sensors 28 and 29 are also disposed. The heating cable 30 and the sensor 31 and 32 are arranged within the subzone 26.

The sensor 28, which can be arranged to sense the air temperature or the heat radiation in the subzone 25, delivers, depending on the detected temperature, a signal to a first input 36 of a control unit 37. The sensor 29 can be arranged within the surface material 8 of the floor in subzone 25 to detect the prevailing floor temperature. It is also possible to arrange the sensor 29 at or under the surface material 8. The sensor 29 delivers, depending on the detected temperature, a signal to an input 38 in the control unit 37. The control unit, which can comprise at least one microprocessor and one or more memory means, registers the measured temperatures, and stores these temperature values in the memory means, indicating the time of registration and other relevant parameters. The registered temperatures can then be compared with historic data, such as previously detected temperatures.

The sensors 31 and 32 deliver in a similar manner signals concerning air and floor temperatures in the subzone 26 to the inputs 39 and 40, respectively.

The control unit 37 is arranged to regulate temperatures in a number of temperature zones individually, but can also regulate the supply of energy to the heat dissipating means so that the total power requirement of the entire construction does not exceed a certain limit value. The heat dissipating means can be engaged at different times so that at each point in time, for example only two heat dissipating means are provided with energy, or so that one zone at a time can be provided with energy.

The regulating device also comprises a setting unit 41, so that an operator/user can set the desired temperatures in the respective zones. The setting unit 41 then delivers the desired temperature values for the respective zones to an input 42 to the control unit 37.

The control unit 37 delivers, depending on the input signals from the sensors 28, 29, 31 and 32, and the rest of the parameters according to the above, control signals to outputs 44 and 46, which are coupled to power units 48 and 50. The power unit 48 emits electrical energy pulses with variable set pulse times to the heat dissipating means 27 in response to control signals from the output 44 of the control unit.

The power unit 48 is fed with electrical energy, for example in the form of alternating current. The energy pulses which the power unit 48 emits to the heat dissipating means 27 can be in the form of alternating current.

According to another embodiment of the invention, the power unit 48 comprises a rectifier to rectify the electrical current before it is fed to the heat dissipating means. By virtue of the fact that the electrical energy is delivered in the form of pulsed direct current, the electrical and magnetic alternating fields of mains frequency which would otherwise be generated in the heat generating means and their feeder cables.

In the same manner, the power unit 50 feeds electrical energy pulses to the heat dissipating means 30 in response to control signals from the control unit output 46 to regulate the heat dissipation in subzone 26.

Figure 8A:
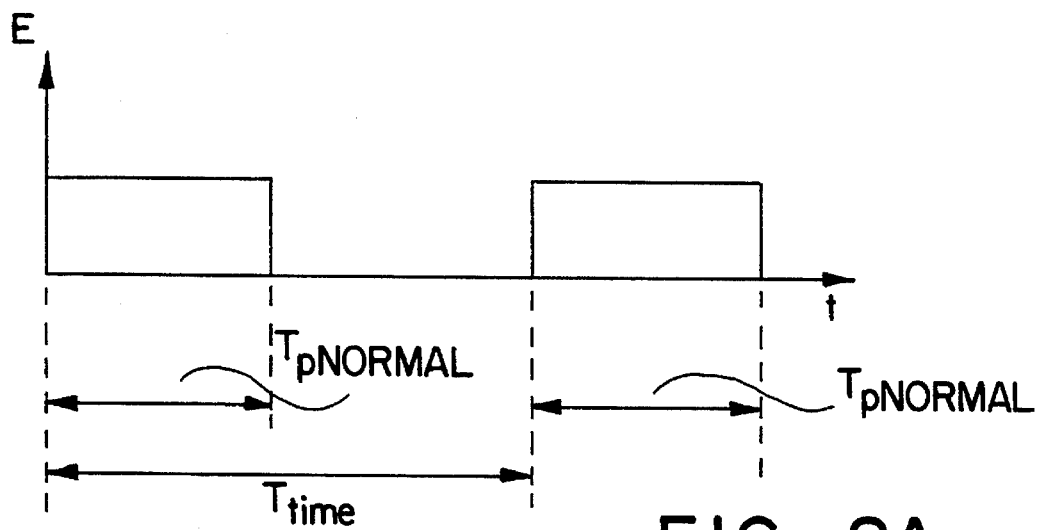
FIG. 8 shows three diagrams with pulse times.
Figure 8B:
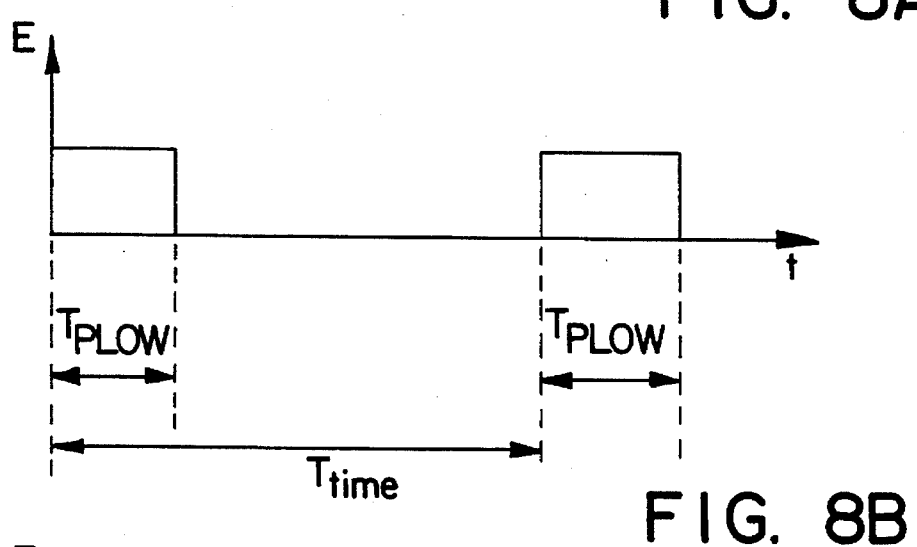
Figure 8C:
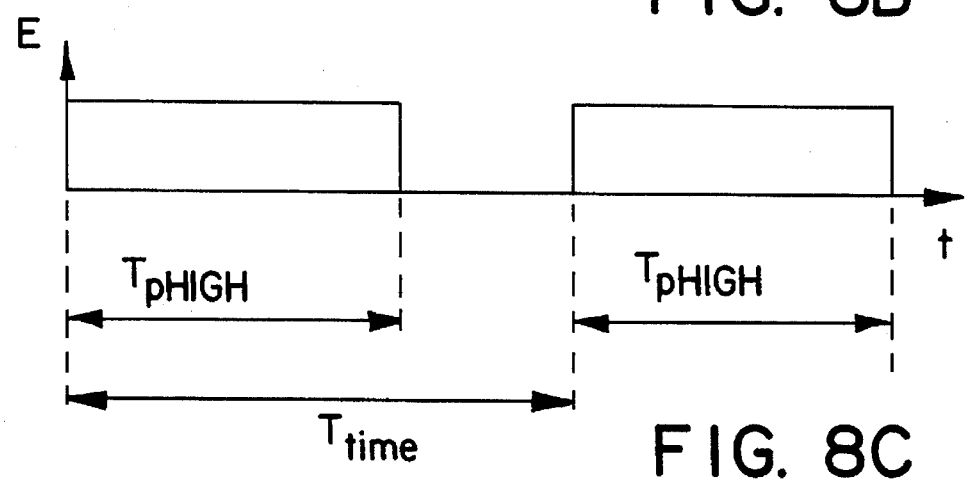

When the need for extra heat agrees with a normal value, the control signal at output 44 causes the power unit 48 to emit energy pulses with a normal pulse time $TP_{normal}$ (FIG. 8). When the need for additional heat exceeds, however, the normal value, the control unit delivers a control signal at output 44 so that the power unit emits energy pulses with a pulse time $TP_{high}$ which exceeds the normal pulse time $TP_{normal}$. When the need for additional heat is less than the normal value, the control unit delivers a control signal at output 44 so that the power unit emits energy pulses with a pulse time $TP_{low}$ which is shorter than the normal pulse time $TP_{normal}$, and thus the additional heat is reduced.

The energy supply to the heat dissipating means can be regulated by periodically emitting a pulse. Each period $T_{time}$, an electrical pulse of varying pulse time Tp is fed out to the heat dissipating means. By varying the pulse ratio $T_p/T_{time}$, the time mean value of the power can be regulated. The period $T_{time}$ can, for example, be 180 seconds and if the pulse time $T_p$ is in this case 90 seconds, the pulse ratio $T_p/T_{time}$ will be $=0.5$. If the heat requirement is higher, the ratio $T_p/T_{time}$ can be increased so that the ratio approaches the maximum value $T_p/T_{time} =180/180=1$. In certain cases, it is, however, suitable to fix another maximum value of the pulse ratio $T_p/T_{time}$ as is described below.

When the heat dissipating means consists of a heating cable, this can be installed in different lengths. When the heating cable is made shorter than a normal length, it can be desirable to limit the pulse ratio so that the time mean value of the power fed cannot exceed a limit value. For this purpose, this control device 37 can be provided with a switch for setting a maximum permissible pulse ratio $T_p/T_{time}$ for each heat dissipating means. It is also possible to store information concerning the maximum permissible pulse ratio in one of the memory means.

According to one embodiment, it is possible to control the power unit so that the power pulse has sloping flanks, i.e. power emitted at each instant increases in a controlled manner from zero watts to a maximum instantaneous power value, and is then reduced in a controlled manner to zero watts again. This process can then be repeated during each pulse time $T_p$.

Figure 7A:
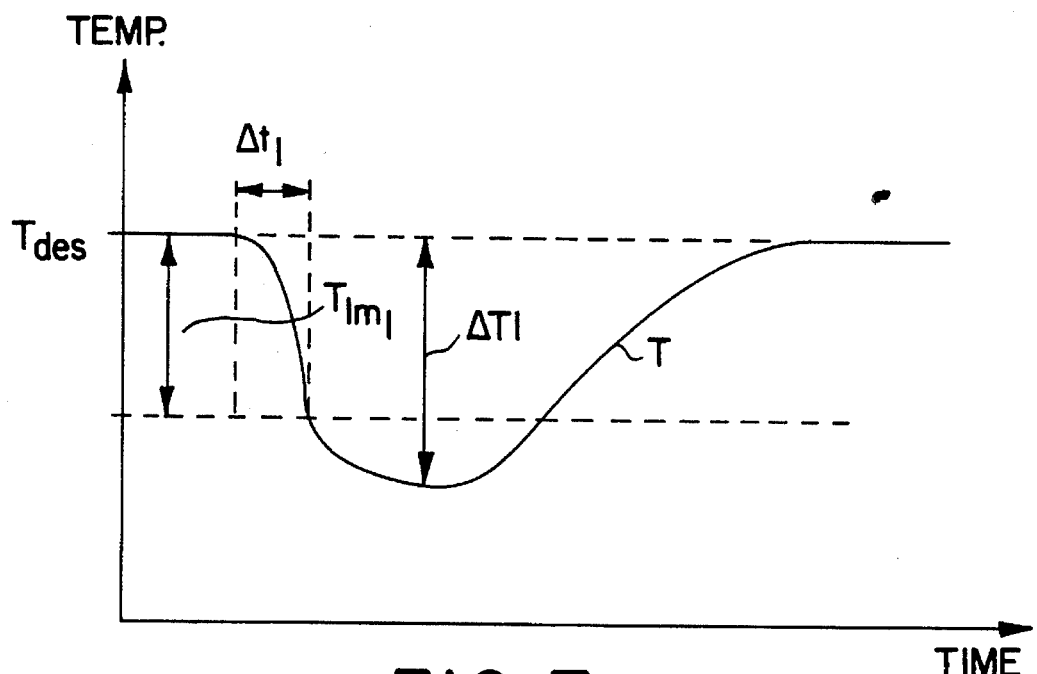
FIG. 7a and 7b are diagrams showing temperature variations when energy is removed or supplied rapidly.
Figure 7B:
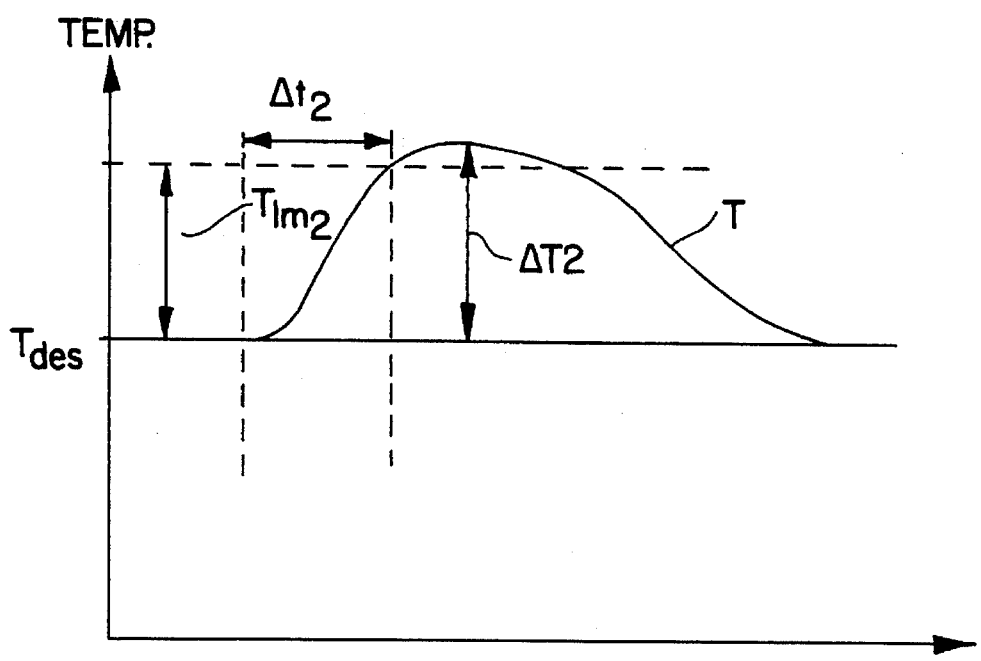

The control unit 37 also has a room airing function. This means that the control unit does not cause so-called heat-rush in response to suddenly detected low temperature values when a room is aired, for example. The air temperature T in a zone usually agrees well with the desired value $T_{des}$ in the same zone. When the air temperature T (FIG. 7) in a temperature zone drops rapidly and a negative temperature deviation ΔT $$\Delta T = (T - T_{des})$$

deviates more than a first limit value $T_{1m1}$ from the desired value $T_{des}$, a clock is started. If the absolute value of the temperature deviation ΔT exceeds the limit value $T_{1m1}$ and this occurs with any predetermined time interval $\Delta t_1$, i.e. if the room temperature drops shortly during a short time interval, the control means 37 maintains the energy supply in the zone in question.

The control means 37 can also completely cut off the energy supply to the heat dissipating means in the zone in question. This is especially suitable when the heat dissipating means in the zone in question consists of wall mounted electric radiators. After the room has been aired, the air is heated in the zone in question by the heat stored in the floor, the walls and the ceiling.

When the air temperature T in a temperature zone rises more than expected, for example as a result of intense solar radiation, and a positive temperature deviation $\Delta T_2$ deviates more than a second limit value $T_{1m2}$ from the desired value $T_{des}$, a clock is started. If the temperature deviation $\Delta T_2$ deviates more than the limit value $T_{1m2}$ and this occurs within a predetermined time interval $\Delta t_2$, i.e. if the room temperature rises sharply during a short time interval, the control means 37 reduces or maintains the energy supply in the zone in question.

The control unit 37 can also be provided with an input 52 for receiving signals from a central control means. Depending on the signals from the central control means, the control unit 37 can reduce or entirely cut off the power to the construction from the central electrical power network, so-called central load control. The central control means can be placed, for example, at the central control position of a power company. The signals from the central control means to the control unit 37 can be relayed by the telephone network or as a signal superimposed on the electrical network.

Knowing the thermal capacity of the floor and the temperature dissipating delays in the floor construction, the control unit can achieve regulation of the temperature in the zone relying on a single temperature sensor 34. The temperature in the zone 24 can thereby be regulated in a similar manner as was described above, with the power unit 35 feeding out electrical pulses in response to signals from an output 54 on the control unit 37. The device for controlling the heat dissipation can also be provided with a function for independently determining the heat storage capacity of a floor construction, based on previously registered measured data concerning the stored energy of the floor construction and the temperature dispersal from the floor construction to the surroundings.

According to an alternative embodiment of the regulating device according to the invention, it can regulate the energy supply to the heat dissipating means only in response to the air temperatures in respective zones. The control unit 37 and the power units 48, 50 and 35 can then work as a thermostat and perform proportional regulating of the respective air temperatures.

The regulating device normally works only with inside temperature sensors, but if it is so desired, it can be supplemented with an outdoor temperature sensor UTGGQ (shown with dashed dot lines in FIG. 6).

I claim:

1. Heated floor construction comprising a supporting floor construction, a number of components of a sheet material, at least one heat dissipating means in the form of an electric cable, and a device for regulating the heat dissipation of the heating cable, said heating cable being disposed in at least one channel between the different sheet components, said at least one channel having a width which is adapted to the largest diameter of the electrical heating cable, and said sheet components having a width which approximately corresponds to a predetermined cable spacing minus the greatest diameter of the heating cable, bevelled corners of the sheet components at those ends where the heating cable changes direction, wherein said at least one channel is limited below by the supporting floor construction, the sheet components consists of one of transverse sheet components and longitudinal sheet components, which are laid out and fixed to the supporting floor construction in such a manner that the heating cable can be laid directly in said at least one channel as a single loop or be divided into a plurality of different loops, said sheet material having a thickness, which approximately corresponds to the greatest diameter of the heating cable, said sheet components being provided with a heat reflecting and heat conducting foil under the heating cable, said foil being supplied along the entire length of the sheet components to cover their entire top side and being pulled down and covering one longitudinal edge of the sheet components and a portion of their underside, as well as the other longitudinal side of the sheet components in such a manner that the foil terminates in a projecting flap, and a surface material being disposed on an upper surface of the sheet components.

2. Heated floor construction according to claim 1, further comprising corner pieces of approximately the same thickness as the sheet components and with an arcuate surface applied radially outside the heating cable at each bevelled corner in order to provide the heating cable with a gentle bending, and fix the same.

3. Heated floor construction according to claim 2, wherein each corner piece consists of a thin bottom plate for insertion under a sheet component and a homogeneous upper piece which is arranged on the bottom plate and has a flat top surface and two edge surfaces, which form an angle to each other of between 45°–90°, and are joined at a surface with a bending radius corresponding to the least allowable bending radius of the heating cable, each corner piece being provided with a through hole for a fixing means.

4. Heated floor construction according to claim 2, wherein the floor construction comprises at least one first temperature sensor arranged for sensing the temperature of the floor construction, and at least one other temperature sensor arranged above the surface material for sensing the temperature above the surface material.

5. Heated floor construction according to claim 1, wherein the heating cable is held in place in said at least one channel with clips, which are fixed to two opposing sheet components.

6. Heated floor construction according to claim 1, wherein the heating cable is held in place by one of adhesive and tape.

7. Heated floor construction according to claim 1, wherein the sheet components consist of one of laminated sheets and boards, which are glued to the supporting floor construction, and wherein the surface material is fixed to the sheet components with one of adhesive and filler plaster.

8. Heated floor construction according to claim 1, wherein the sheet components consist of glass-fiber reinforced concrete and are fixed to the floor construction with a moisture-permeable adhesive paste, said surface material consisting of a moisture-permeable material, and being fixed to the sheet components with a moisture-permeable adhesive paste.

9. Heated floor construction according to claim 1, further including a spacer material laid at the thin surface material between the sheet components and the surface material.

10. Heated floor construction according to claim 1, wherein the heating cable at both its ends is provided with connecting cables, which are at least partially laid in the floor construction.

11. Heated floor construction according to claim 1, wherein the device for regulating the heat dissipation is disposed, depending on signals from at least one temperature sensor, to supply energy to the heating cable in the form of electrical current pulses with a certain pulse time, said pulse time being in a predetermined relation to the heat requirement in question.

12. Heated floor construction according to claim 11, wherein the device for regulating the heat dissipation is disposed to control the heat energy given out from said at least one heat dissipating means during a specific time interval depending on the heat dissipation from the floor construction under at least one previously determined time interval.

13. Heated floor construction according to claim 11, wherein the floor construction comprises at least one temperature zone housing said at least one heat dissipating means and at least one temperature sensor.

14. Heated floor construction according to claim 11, wherein the device for regulating the heat dissipation includes one of means for maintaining and reducing the supply of energy to the heating cable upon sensing a temperature change exceeding a predetermined limit value during a predetermined time interval.

15. Heated floor construction according to claim 1, wherein the device for regulating heat dissipation is disposed to independently determine the heat storage capacity of a floor construction, based on a previously registered measurement data concerning energy stored in the floor construction and heat dissipation from the floor construction to the surroundings.

16. Heated floor construction according to claim 1, wherein the floor construction comprises at least one first temperature sensor arranged for sensing the temperature of the floor construction, and at least one other temperature sensor arranged above the surface material for sensing the temperature above the surface material, said device for regulating the heat dissipation being disposed, depending on signals from at least one temperature sensor, to supply energy to the heating cable in the form of electrical current pulses with a certain pulse time which is in a predetermined relation to the heat requirement in question.

17. Heated floor construction according to claim 1, wherein the floor construction comprises at least one first temperature sensor arranged for sensing the temperature of the floor construction, at least one other temperature sensor arranged above the surface material for sensing the temperature above the surface material, and at least one temperature zone housing said at least one heat dissipating means, and at least one temperature sensor.

18. Heated floor construction comprising a supporting floor construction, a number of components of a sheet material, at least one heat dissipating means in the form of an electric cable, and a device for regulating the heat dissipation of the heating cable, said heating cable being disposed in at least one channel between the different sheet components, said at least one channel having a width which is adapted to the largest diameter of the electrical heating cable, and said sheet components having a width which approximately corresponds to a predetermined cable spacing minus the greatest diameter of the heating cable, bevelled corners of the sheet components at those ends where the heating cable changes direction, wherein said at least one channel is limited below by the supporting floor construction, the sheet components consists of one of transverse sheet components and longitudinal sheet components, which are laid out and fixed to the supporting floor construction in such a manner that the heating cable can be laid directly in said at least one channel as a single loop or be divided into a plurality of different loops, said sheet material having a thickness, which approximately corresponds to the greatest diameter of the heating cable, and a surface material being disposed on an upper surface of the sheet components, said floor construction comprising at least one first temperature sensor arranged for sensing the temperature of the floor construction, at least one other temperature sensor arranged above the surface material for sensing the temperature above the surface material, and at least one temperature zone housing said at least one heat dissipating means, and at least one temperature sensor.

19. Heated floor construction comprising a supporting floor construction, a number of components of a sheet material, at least one heat dissipating means in the form of an electric cable, and a device for regulating the heat dissipation of the heating cable, said heating cable being disposed in at least one channel between the different sheet components, said at least one channel having a width which is adapted to the largest diameter of the electrical heating cable, and said sheet components having a width which approximately corresponds to a predetermined cable spacing minus the greatest diameter of the heating cable, bevelled corners of the sheet components at those ends where the heating cable changes direction, corner pieces of approximately the same thickness as the sheet components and with an arcuate surface applied radially outside the heating cable at each bevelled corner in order to provide the heating cable with a gentle bending and fix the same, wherein said at least one channel is limited below by the supporting floor construction, the sheet components consists of one of transverse sheet components and longitudinal sheet components, which are laid out and fixed to the supporting floor construction in such a manner that the heating cable can be laid directly in said at least one channel as a single loop or be divided into a plurality of different loops, said sheet material having a thickness, which approximately corresponds to the greatest diameter of the heating cable, and a surface material being disposed on an upper surface of the sheet components.

* * * * *